(12) United States Patent
Platt (10) Patent No.: US 7,686,360 B2
(45) Date of Patent: Mar. 30, 2010

(54) WASTE COLLECTION AND DISPOSAL APPARATUS AND METHOD OF MANUFACTURE

(76) Inventor: Sheri L. Platt, 1289 Magothy Rd., Pasadena, MD (US) 21122

( * ) Notice: Subject to any disclaimer, the term of this patent is extended or adjusted under 35 U.S.C. 154(b) by 385 days.

(21) Appl. No.: 11/627,682

(22) Filed: Jan. 26, 2007

(65) Prior Publication Data

US 2007/0170732 A1   Jul. 26, 2007

Related U.S. Application Data

(60) Provisional application No. 60/762,119, filed on Jan. 26, 2006.

(51) Int. Cl.
*A01K 29/00* (2006.01)
*E01H 1/12* (2006.01)

(52) U.S. Cl. .......................... 294/1.3; 294/55

(58) Field of Classification Search .............. 294/1.1, 294/1.3, 1.4, 55; 248/101; 15/257.3; 141/108, 141/109, 390, 391; 209/417–419
See application file for complete search history.

(56) References Cited

U.S. PATENT DOCUMENTS

| | | | |
|---|---|---|---|
| 1,987,011 A * | 1/1935 | Kahn | 210/470 |
| 4,148,513 A * | 4/1979 | Gagne | 294/1.4 |
| 4,149,745 A * | 4/1979 | Willis | 294/1.4 |
| 5,020,751 A | 6/1991 | Larkin | |
| D334,255 S | 3/1993 | Nelson | |
| 5,400,572 A | 3/1995 | Peck | |
| 5,580,111 A | 12/1996 | Bohn | |
| D387,514 S * | 12/1997 | Savicki | D30/162 |
| 5,868,447 A * | 2/1999 | Clark et al. | 294/1.4 |
| 6,237,973 B1 * | 5/2001 | Dupont et al. | 294/9 |
| 6,708,742 B2 * | 3/2004 | Weathers et al. | 141/391 |
| 2004/0145196 A1 | 7/2004 | Katz | |
| 2005/0184540 A1 | 8/2005 | Graziosi | |
| 2006/0243867 A1 * | 11/2006 | Strickland et al. | 248/101 |

* cited by examiner

*Primary Examiner*—Dean J Kramer
(74) *Attorney, Agent, or Firm*—Miles & Stockbridge P.C.; David R. Schaffer, Esq.

(57) ABSTRACT

An apparatus for waste collection and disposal including a tube portion which includes a longitudinal axis, a first end defining a first opening, a second end defining a second opening, an outer side, and an inner side defining a channel between the first and second ends. The apparatus for waste collection and disposal also including a scoop portion coupled to the first end of the tube portion, a plurality of clips coupled to the outer side of the tube portion, and a handle portion coupled to the outer side of the tube portion.

23 Claims, 13 Drawing Sheets

WASTE COLLECTION AND DISPOSAL APPARATUS AND METHOD OF MANUFACTURE

CROSS REFERENCE TO RELATED APPLICATIONS

The present application claims the benefit of priority under 35 U.S.C. §119(e) to U.S. Provisional Patent Application No. 60/762,119, filed Jan. 26, 2006, entitled "Waste Collection and Disposal Product and Method of Use Thereof," the content of which is herein incorporated by reference in its entirety.

FIELD OF THE INVENTION

The present invention relates generally to an apparatus for waste collection and disposal and to a method of manufacturing the apparatus for waste collection and disposal.

BRIEF DESCRIPTION OF THE DRAWINGS

The accompanying drawings, which are incorporated in and constitute a part of this specification, illustrate embodiments of the invention. The invention will be best understood by reading the ensuing specification in conjunction with the drawing figures, in which like elements are designated by like reference numerals, and wherein:

FIG. 7 represents a front view of the apparatus for waste collection and disposal of FIG. 5, in accordance with an alternative embodiment of the present invention.

DETAILED DESCRIPTION OF THE PREFERRED EMBODIMENTS

Embodiments consistent with the present invention include (i.e., comprise) a waste collection and disposal apparatus to efficiently and effectively collect and dispose of waste, so as to reduce an amount of odor, spillage, and contamination associated with collecting and disposing of waste. Embodiments consistent with the present invention may allow for waste to be collected and transferred to a collection receptacle which is attached to the waste collection and disposal apparatus. After transferring the waste to the collection receptacle, the collection receptacle may be removed from the waste collection and disposal apparatus, sealed, and discarded.

The waste collection and disposal apparatus may be made of any suitable material known in the art, including, but not limited to, plastics (including thermoplastics), elastomers, metals, glasses, ceramics, etc. The waste collection and disposal apparatus may be manufactured or otherwise made by any suitable manner or method known in the art, including, but not limited to, injection molding, sand molding, etc. In addition, the waste collection and disposal apparatus may be manufactured in any suitable manner known in the art, such as a single unit using, for example, but not limited to, injection molding and then assembling separate sections, or assembling the apparatus from separate parts.

Figure 1:
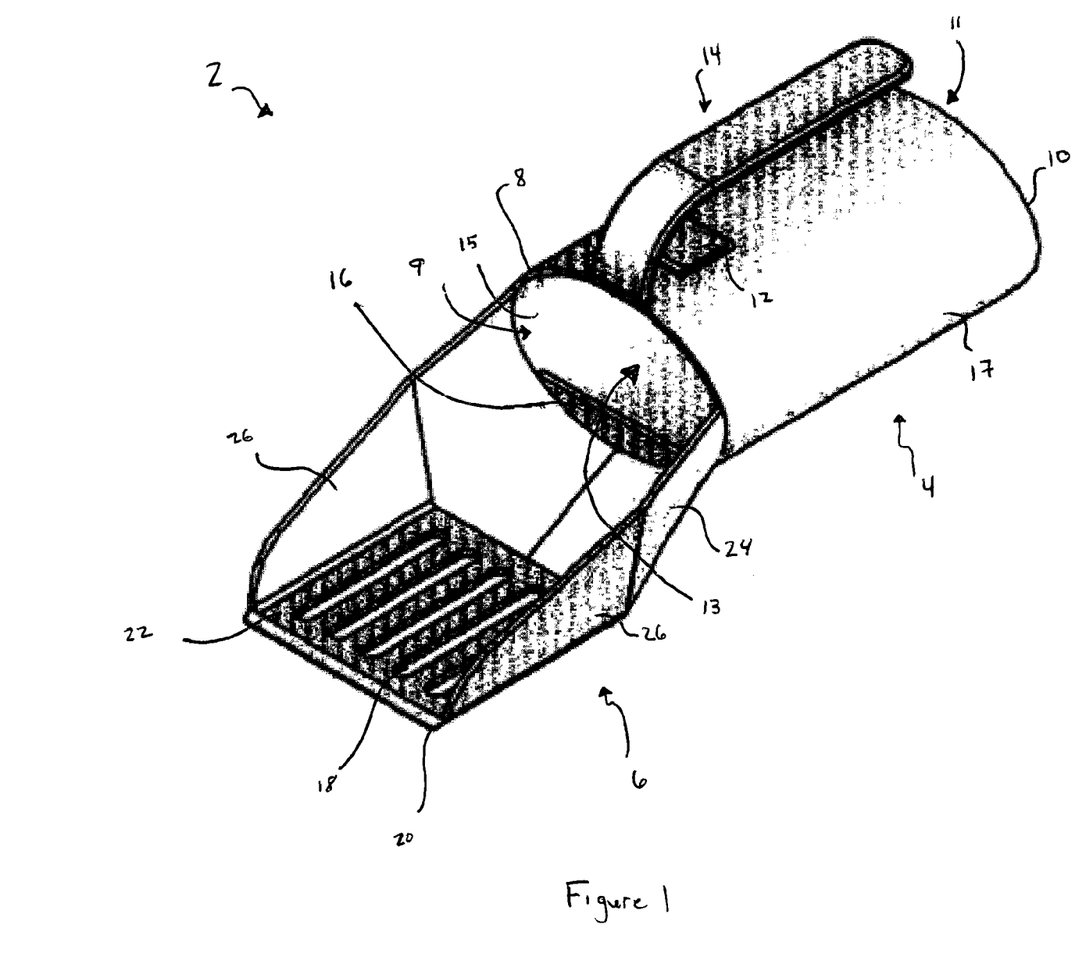
FIG. 1 is a front perspective view of an apparatus for waste collection and disposal, in accordance with an embodiment of the present invention.
Figure 2:
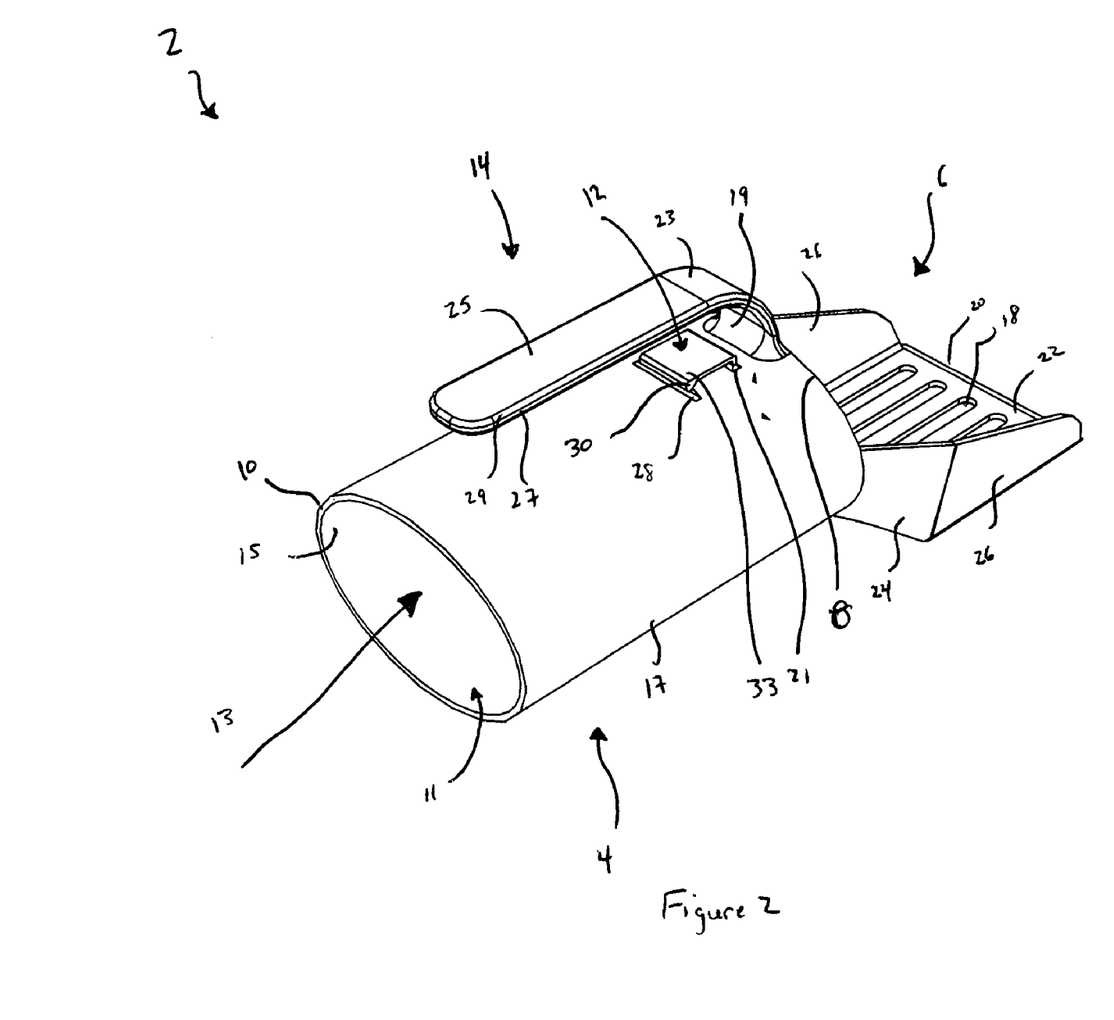
FIG. 2 is a rear perspective view of the apparatus for waste collection and disposal of FIG. 1, in accordance with an embodiment of the present invention.
Figure 11:
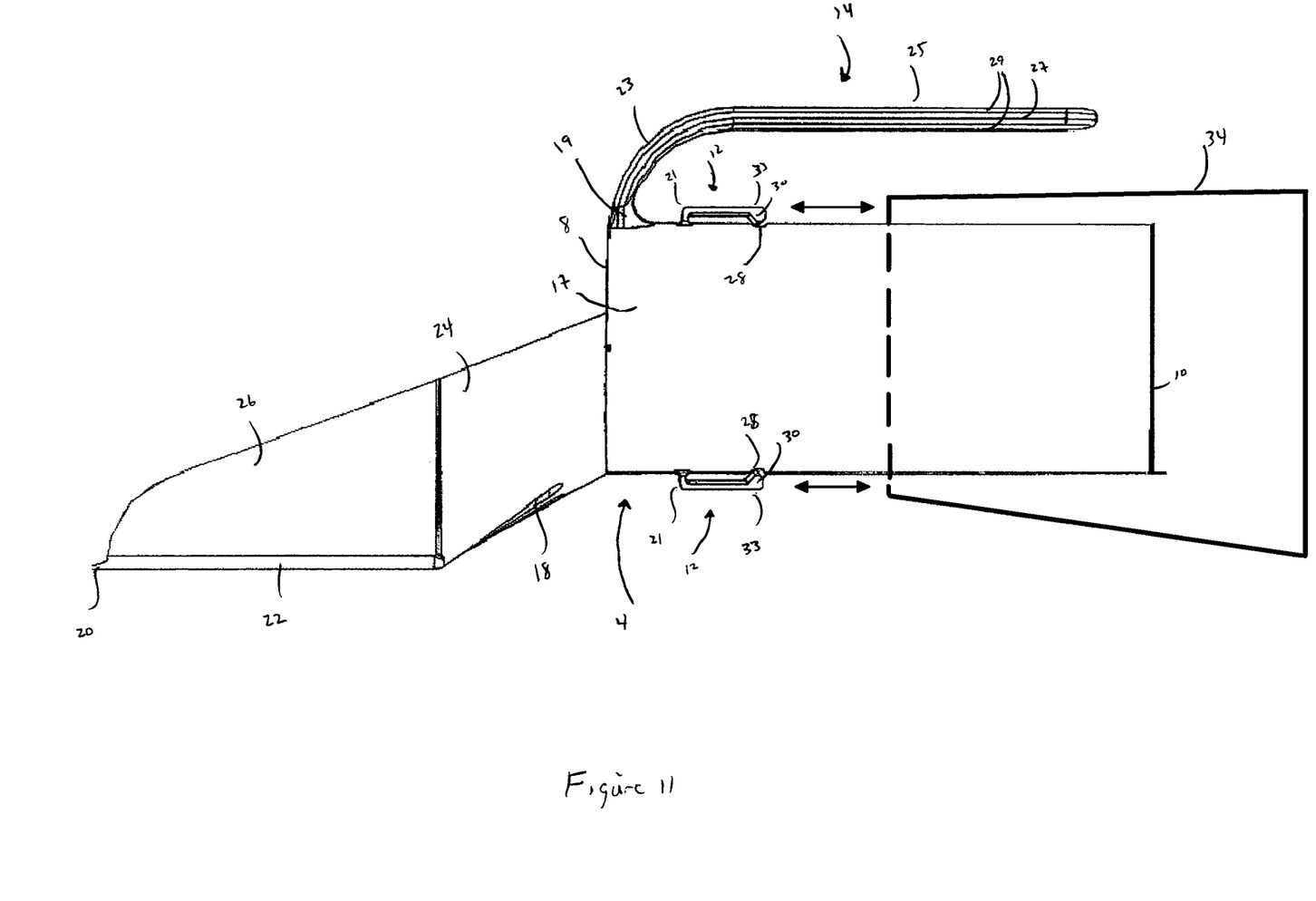
FIG. 11 represents a view from a second side of the apparatus for waste collection and disposal of FIG. 5, in accordance with an alternative embodiment of the present invention.

FIGS. 1 and 2 are front and rear perspective views, respectively, of an apparatus for waste collection and disposal, in accordance with an embodiment of the present invention. The waste collection and disposal apparatus 2 of FIGS. 1 and 2 comprises a tube portion 4 including a longitudinal axis, a scoop portion 6 coupled to a first end 8 of tube portion 4, a handle portion 14 coupled adjacent to first end 8 of tube portion 4, and a collection receptacle 34 (as seen in FIG. 11) that may cover a second end 10 of and be removably coupled to tube portion 4.

Tube portion 4 may be in the form of any known shape that can be configured as a tube and may have any suitable dimensions. For example, in FIGS. 1 and 2, tube portion 4 is represented by an oval tube having substantially straight sides and ends, such as first end 8 and second end 10. Tube portion 4 may also have substantially straight sides and/or flared ends (not shown). Flared ends may facilitate the transition of waste into and/or out of tube portion 4, thereby minimizing spillage. First end 8 and second end 10 each define, respectively, a first opening 9 and a second opening 11 that both provide access to a channel 13 that is defined by an inner side 15 of tube portion 4 and that extends from first end 8 to second end 10. As seen in FIGS. 1 and 2, first end 8 of tube portion 4 is coupled to scoop portion 6, and handle portion 14 is coupled to outer side 17 of tube portion 4 and adjacent first end 8. In general, handle portion 14 is opposite scoop portion 6 to facilitate the scooping of waste with scoop portion 6.

As shown in FIGS. 1 and 2, tube portion 4 may also include a waste trap bar 16, a plurality of clips 12, and a plurality of recesses 28.

Waste trap bar 16 may be used to prevent waste from returning to the scoop portion 6 or from otherwise exiting first end 8 of tube portion 4. Waste trap bar 16 is formed on inner side 15, along the bottom of tube portion 4. In FIG. 1, waste trap bar 16 is formed adjacent first end 8 of tube portion 4. However, waste trap bar 16 may be formed at any position along the longitudinal axis of tube portion 4. In addition, waste trap bar 16 extends in a direction substantially perpendicular to the longitudinal axis of tube portion 4. Waste trap bar 16 may be of any suitable dimensions, and may extend upward from the bottom of tube portion 4 to a variety of heights, but, generally, waste bar trap 16 extends less than half the diameter of tube portion 4. For example, waste bar trap 16 may extend to a height of, but not limited to, 0.475 inches of a 2.75 inch diameter tube portion 4. In an alternative embodiment (not shown), waste bar trap 16 may also be angled back toward second end 10, for example, from 1 to 45 degrees or more from perpendicular. This may serve to both promote the easy passage of waste through first end 8 and into tube portion 4 from scoop portion 6 and to prevent waste inside tube portion 4 from coming back out through first end 8.

FIG. 2 shows a recess 28 formed on a top side of outer side 17 of tube portion 4. Though not shown, another recess may be formed on the opposite side (bottom side) of outer side 17 of tube portion 4 (not shown). In addition, tube portion 4 may include more than two recesses (not shown), where the recesses may be, but are not limited to being, spaced substantially evenly in a tangential direction around outer side 17 of tube portion 4. Each recess 28 may extend along tube portion 4 in a direction substantially perpendicular to the longitudinal axis of tube portion 4. Each recess 28 may be of any appropriate dimensions and may be formed at any appropriate location on outer side 17 of tube portion 4. The length of each recess 28 may be greater than, equal to, or less than the width of handle portion 4. Moreover, the length of recess 28 may be greater than, equal to, or less than the width of clip 12. For example, FIG. 2 shows the length of recess 28 being greater than the width of clip 12.

In FIGS. 1 and 2, a clip 12 includes a first end 21 and a second end 33. First end 21 is coupled to the top side of outer side 17 of tube portion 4 so that second end 33 is adjacent to recess 28. As with recess 28, another clip (not shown) may be coupled to the bottom side of outer side 17 of tube portion 4 and adjacent to the recess on the bottom side. In addition, tube portion 4 may include more than two clips (not shown). Each clip 12 is associated with one of the recesses 28 to form a clip 12/recess 28 combination. Each clip 12 may also extend rearward along tube portion's 4 longitudinal axis toward second end 10 of tube portion 4. The clip 12/recess 28 combination may be used to releasably couple collection receptacle 34 to tube portion 4. Collection receptacle 34 may be, but is not limited to, a waste collection receptacle, such as a bag. For example, the clip 12/recess 28 combination may be used to grasp multiple sizes, styles, and shapes of bags, which may prevent the bags from slipping off tube portion 4. In general, the bags are disposable, but embodiments are contemplated in which the bags may be reusable. The combination may also eliminate the need to hold the disposable bag in place, thereby eliminating hand contamination.

Figure 3:
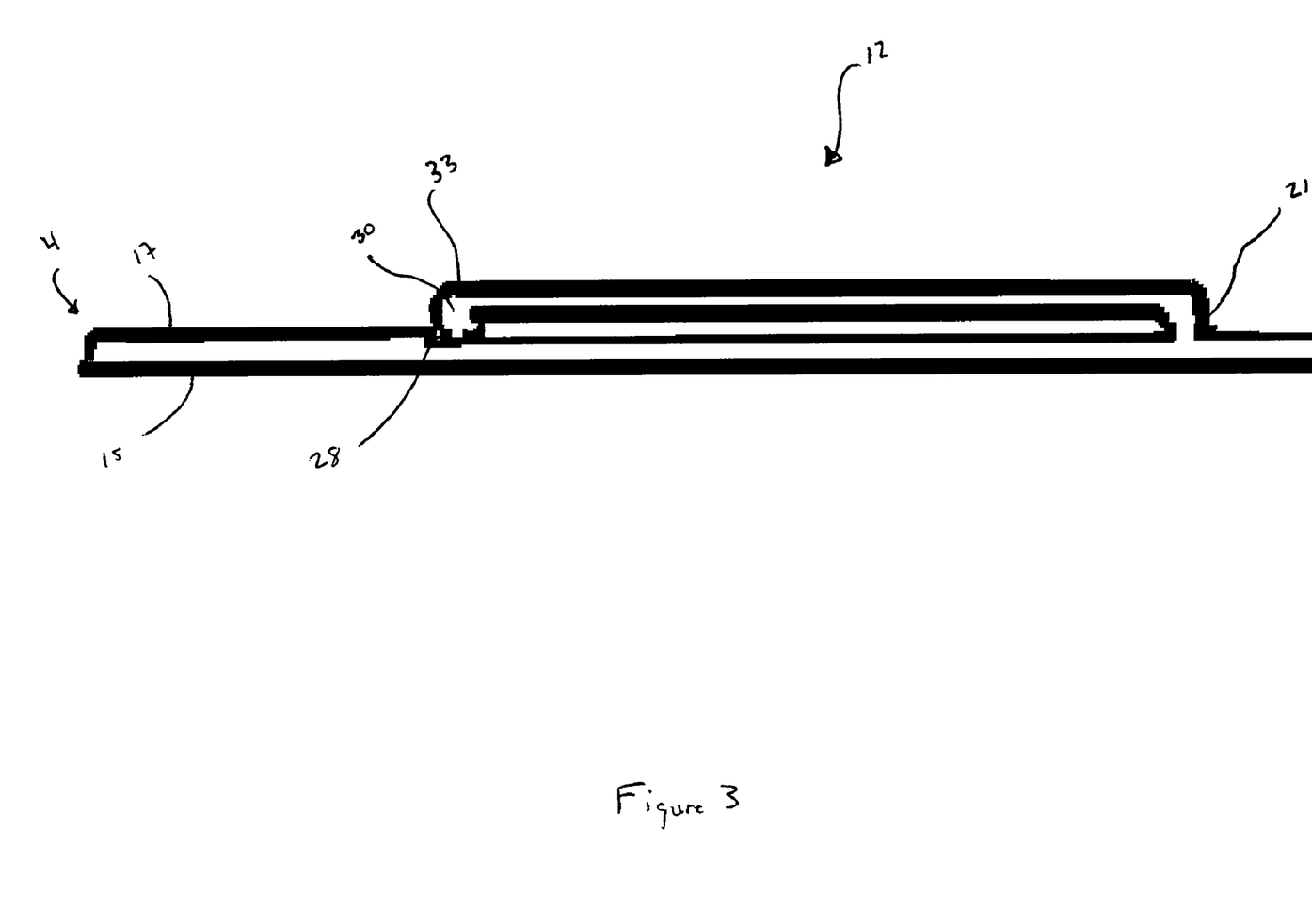
FIG. 3 is a cross-sectional view of a clip and a recess, in accordance with an embodiment of the present invention.

FIG. 3 is a cross-sectional view of a clip 12 and recess 28 combination, in accordance with an embodiment of the present invention. As shown in FIG. 3, clip 12 may be coupled to tube portion 4 at first end 21 and may have a protrusion 30 at a second end 33, which may make protrusion 30 adjacent to recess 28. Protrusion 30 may be of any suitable dimension and may extend toward and/or into recess 28. Protrusion 30 may also be biased toward and/or against recess 28, or may frictionally engage recess 28.

Figure 4:
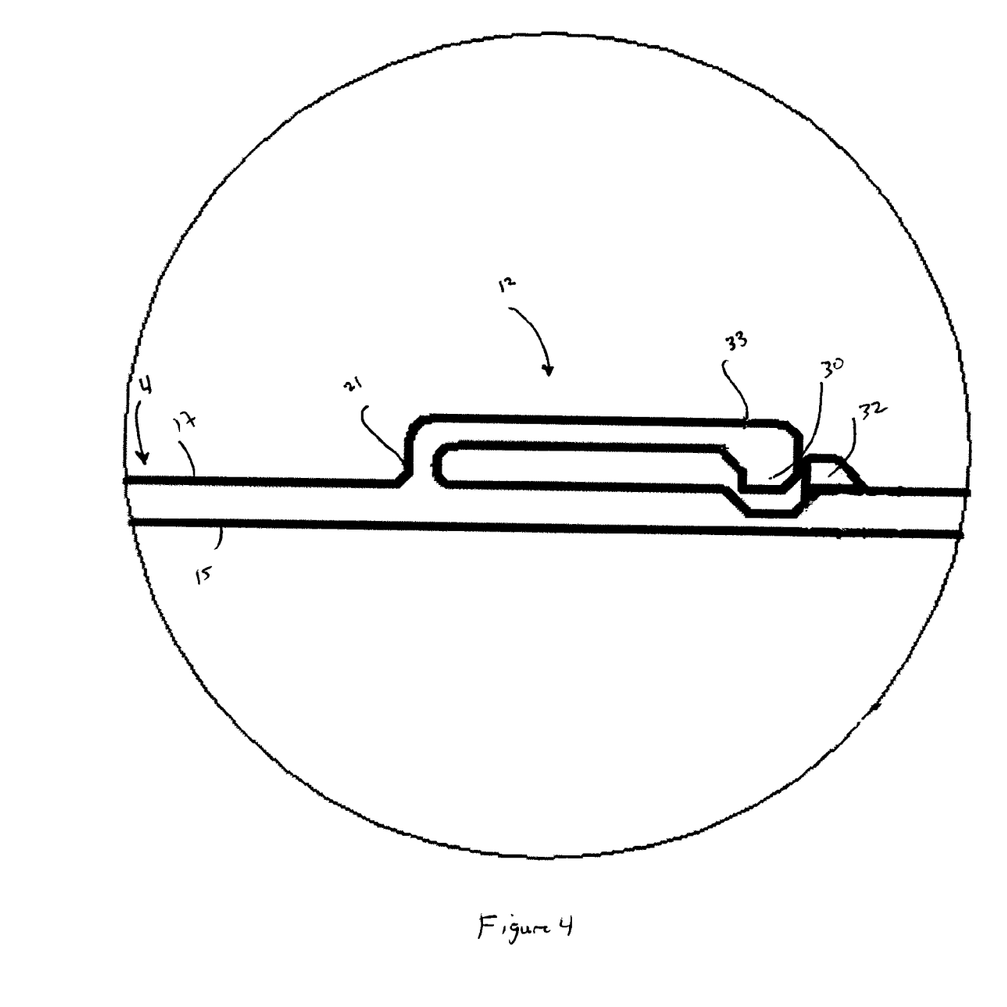
FIG. 4 is a cross-sectional view of a clip and a recess, in accordance with an alternative embodiment of the present invention.

FIG. 4 is a cross-sectional view of a clip 12 and recess 28 combination, in accordance with an alternative embodiment of the present invention. As shown in FIG. 4, tube portion 4 may further include a ridge 32 associated with, for example, immediately adjacent, and substantially parallel to recess 28. Embodiments of the present invention are contemplated in which one ridge 28 may be associated with some or all of recesses 28 on tube portion 4. In addition, a length of ridge 32 parallel to recess 28 may be greater than, equal to, or less than a perpendicular length of recess 28. Clip 12 may be coupled to tube portion 4 at a first end 21 and may have a protrusion 30 at a second end 33. Protrusion 30 may be of any suitable dimension and may extend toward and/or into recess 28. In addition, according to an alternative embodiment of the present invention, protrusion 30 may be either biased against or frictionally engage recess 28 and/or associated ridge 32.

Returning to FIGS. 1 and 2, handle portion 14 is coupled to outer side 17 of tube portion 4, as discussed above. Also as discussed above, handle portion 14 is coupled to first end 8 of tube portion 4, but may be coupled at any position on outer side 17, first end 8, or second end 10 of tube portion 4, but, generally, will be positioned closer to first end 8. Handle portion 4 may take any suitable shape and may be made of any suitable material known in the art. For example, handle portion 14 may have, but is not limited to, rounded edges and/or ends, molded finger grooves, padding, etc., which may promote a more comfortable grip. Padding may include, but is not limited to, foam, rubber, leather, etc.

As shown in FIGS. 1 and 2, handle portion 14 includes an attachment portion 19 that is coupled at its bottom end to tube portion 4, an upwardly extending portion 23 coupled at a downward end to a top end of attachment portion 19, and a grip portion 25 coupled at an anterior end to an upward end of upwardly extending portion 23. In general, handle portion 14 is aligned substantially parallel to the longitudinal axis of tube portion 4. Though not shown in detail, handle portion 4 may also include an inner portion 27 and an outer portion 29, which will be described in greater detail when describing FIG. 10 below. It is appreciated that any description herein of handle portion 4 relates to any embodiments of apparatus for waste collection and disposal 2.

FIGS. 1 and 2 also show scoop portion 6 to include a front edge 20, a flat portion 22 having a plurality of apertures 18, an inclined portion 24, and sidewall portions 26. Scoop portion 6 may be of any suitable dimensions and may be made from any suitable material known in the art, such as, but not limited to, metal, plastic, etc. Each element of scoop portion 6 may be manufactured as an individual unit and assembled as a part of scoop portion 6. Alternatively, scoop portion 6 may be either a single piece or integral to tube portion 4.

Front edge 20 has a first side coupled to flat portion 22 and a second side having an acute-angled edge. The angle of the edge may be any suitable acute angle to aid in transferring waste into scoop portion 6. For example, the angle may be, but is not limited to, any angle between about thirty degrees and about sixty degrees.

Flat portion 22 is coupled at a first end to front edge 20, at a second end to inclined portion 24, and at its side edges by sidewall portions 26. A top surface of flat portion 22 may be substantially parallel to the longitudinal axis of tube portion 4. However, flat portion 22 may also be configured to be at any suitable angle with the longitudinal axis of tube portion 4 to aid in scooping up waste.

Flat portion 22 may include multiple apertures 18, which may be of any suitable shape or size. In general, apertures 18 are designed to maximize the passing through of materials intended to be passed through, while also maximizing retention of the intended waste. Apertures 18 may also be located on flat portion 22 according to any predetermined pattern. Alternatively, apertures 18 may be randomly located on flat portion 22. For example, in FIGS. 1 and 2, apertures 18 are longitudinally elongated in a direction parallel to the longitudinal axis of tube portion 4. Apertures 18 may also have rounded ends and edges.

Sidewall portions 26 may be respectively coupled to and extend upwardly away from flat portion 22 and be coupled to inclined portion 24. Sidewall portions may take the form of any suitable shape. For example, the embodiment in FIGS. 1 and 2 shows sidewall portions 26 being substantially flat with one edge tapering off as it approaches front edge 20 from a side coupled to inclined portion 24. Sidewall portions 26 may allow for efficient and effective (i.e., less spillage) funneling of waste toward tube portion 4.

Inclined portion 24 may be coupled at a first end to first end 8 of tube portion 4, and at a second end to both side wall portions 26 and flat portion 22. Inclined portion 24 may take the form of any suitable shape. Moreover, inclined portion 24 may extend upwardly away from flat portion 22 and be shaped to couple to first end 8 of tube portion 4. In addition, a point at which the first end of inclined portion 24 is coupled to the bottom-most portion of the first end 8 of tube portion 4 forms an angle, as referenced from the longitudinal axis of tube portion 4, with a point at which the second end of inclined portion 24 meets flat portion 22. The angle may be any suitable angle; however, generally, the angle is an acute angle.

Collection receptacle 34 may be removably coupled to tube portion 4 via clips 12 or via combinations of clips 12 and recesses 28 (with or without associated ridges 32). Collection receptacle 34 may be any suitable receptacle known in the art, including, but not limited to, plastic bags, trash bags, etc.

FIGS. 5-11 represent various representations and views of an alternative embodiment of a waste collection and disposal apparatus 2 according to the present invention. With the exception of scoop portion 6, which will be described in greater detail below, features of the alternative embodiment are substantially similar to features of the embodiment related to FIGS. 1-4 discussed above, and will not be entirely repeated. Also note that although not shown, ridge 32 from FIG. 4 could be implemented in an alternative embodiment of the present invention depicted in FIGS. 5-11.

Figure 5:
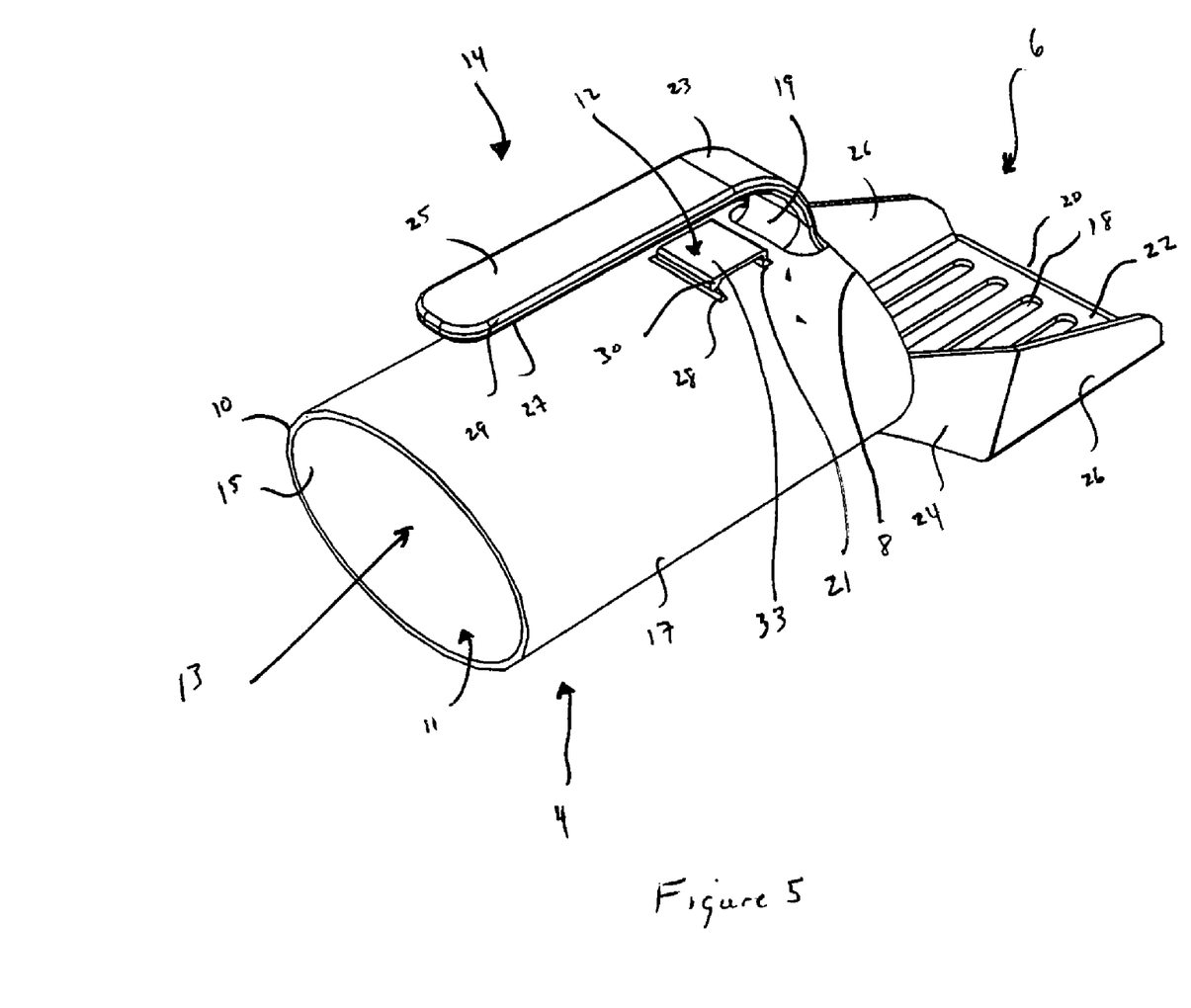
FIG. 5 represents a side perspective of an apparatus for waste collection and disposal, in accordance with an alternative embodiment of the present invention.

FIG. 5 represents a side perspective view of an apparatus for waste collection and disposal 2, in accordance with an alternative embodiment of the present invention. As can be seen from FIG. 5, with the exception of flat portion 22, including apertures 18, and inclined portion 24, features of scoop portion 6 associated with the alternative embodiment are likewise substantially similar to features of scoop portion 6 associated with the embodiment discussed above in relation to FIGS. 1-4, and will not be entirely repeated.

Figure 6:
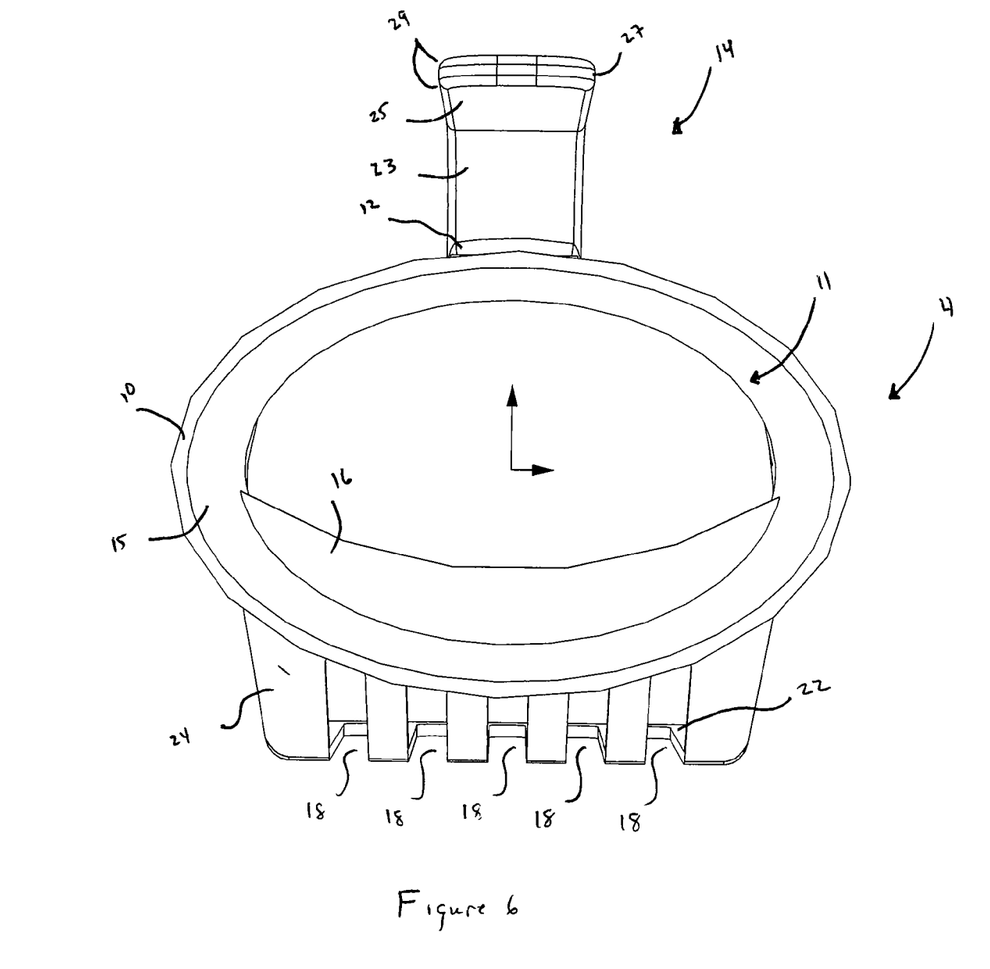
FIG. 6 represents a rear view of the apparatus for waste collection and disposal of FIG. 5, in accordance with an alternative embodiment of the present invention.

FIG. 6 represents a rear view of the apparatus for waste collection and disposal 2 of FIG. 5, in accordance with an alternative embodiment of the present invention. FIG. 6 shows a thickness of tube portion 4, which may be of any suitable thickness.

In FIG. 6, both flat portion 22 and inclined portion 24 may include apertures 18. Apertures 18 may be of any suitable shape or size, and are designed to maximize the passing through of intended materials, while also maximizing retention of the intended waste. For example, FIG. 6 shows each aperture 18 extending through both flat portion 22 and inclined portion 24.

Also shown in greater detail in FIG. 6 is waste trap bar 16. As discussed above, waster trap bar 16 is substantially similar to waste trap bar 16 described with respect to FIGS. 1-4. As shown, waste trap bar 16 may extend across inner side 15 of tube portion 4. In addition, waste trap bar 16 is shown positioned away from second end 10, but may be positioned at any position along inner side 15.

FIG. 7 represents a front view of the apparatus for waste collection and disposal 2 of FIG. 5, in accordance with an alternative embodiment of the present invention. In FIG. 7, apertures 18 may be, for example, longitudinally elongated through both flat portion 22 and inclined portion 24. Apertures 18 may also have rounded edges and/or ends. Although not shown, apertures 18 may also exist separately on both of or one of flat portion 22 and inclined portion 24.

In FIG. 7, the thicknesses of inclined portion 24, sidewall portions 26, and flat portion 22 may be of any suitable thickness, for example, but not limited to, approximately 0.1 inches, and may be the same or different for each respective portion.

Figure 8:
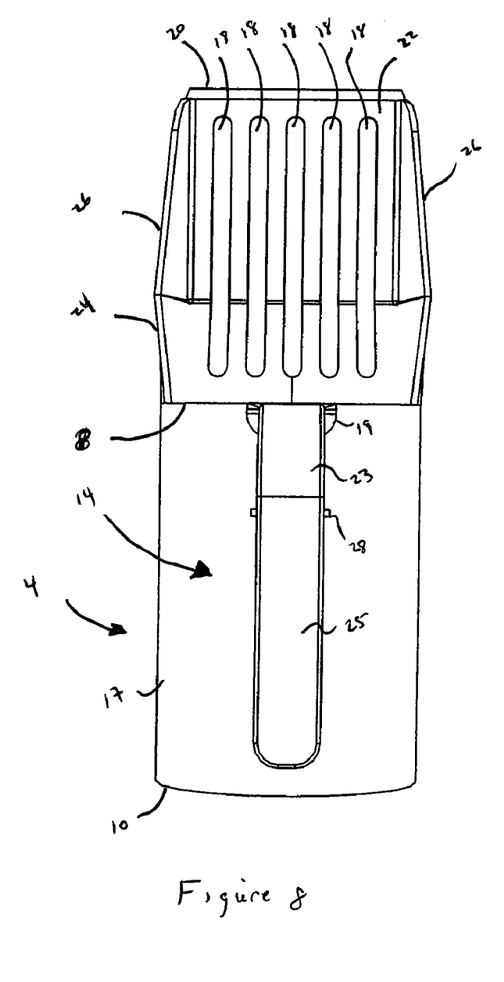
FIG. 8 represents an overhead view of the apparatus for waste collection and disposal of FIG. 5, in accordance with an alternative embodiment of the present invention.

FIG. 8 represents an overhead view of the apparatus for waste collection and disposal 2 of FIG. 5, in accordance with an alternative embodiment of the present invention. In FIG. 8, apertures 18 may be longitudinally elongated through both flat portion 22 and inclined portion 24. In addition, apertures 18 may be located on flat portion 22, inclined portion 24, or both based on a predetermined pattern or configuration. For example, as shown in FIG. 8, apertures 18 are spaced apart from adjacent apertures 18 at equal intervals. An aperture 18 may also be aligned in parallel with the longitudinal axis of tube portion 4.

Also note that FIG. 8 only shows recess 28. However, in an alternative embodiment, ridge 32 (not shown) can be implemented adjacent recess 28. As is also apparent from FIG. 8, clip 12 is not shown because it is obstructed by handle portion 14. Thus, clip 12 may have a width equal to or less than the width of handle portion 14. In addition, note that in this embodiment, recess 28 has a length greater than the width of handle portion 14. The length of recess 28 with respect to the width of handle portion 14 may be any suitable ratio. The width of clip 12 with respect to the width of handle portion 14 may also be any suitable ratio. However, in general, the length of recess 28 may be equal to or greater than the width of clip 12. Similarly, though not shown, the length of ridge 32 parallel to recess 28 may be greater than, equal to, or less than the length of recess 28.

Figure 9:
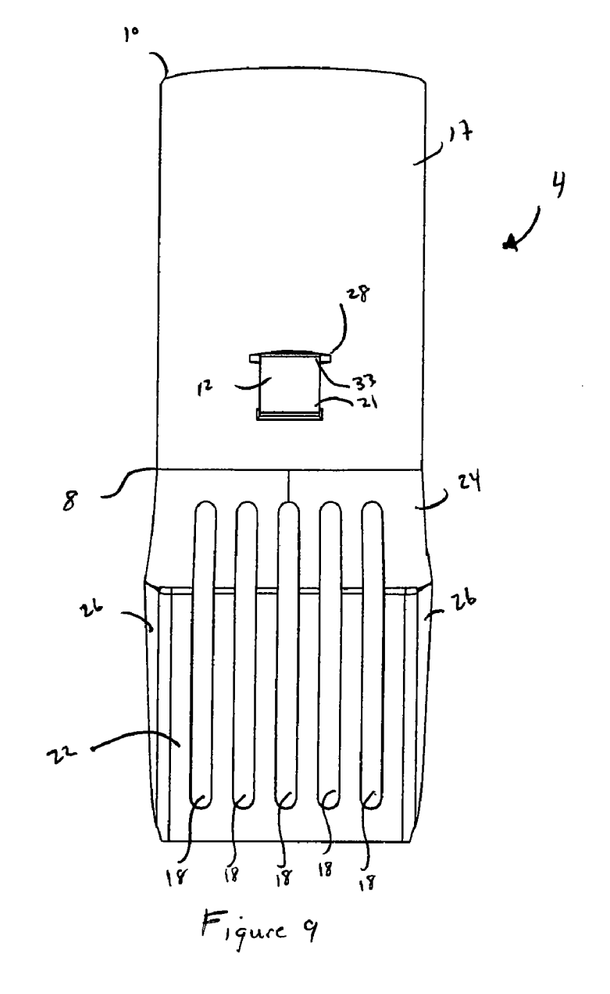
FIG. 9 represents a bottom view of the apparatus for waste collection and disposal of FIG. 5, in accordance with an alternative embodiment of the present invention.

FIG. 9 represents a bottom view of the apparatus for waste collection and disposal 2 of FIG. 5, in accordance with an alternative embodiment of the present invention. Similar to FIG. 8, in FIG. 9, recess 28 is shown without ridge 32. However, in an alternative embodiment, recess 28 and ridge 32 (not shown) can be implemented together. Respective length of recess 28 and width of clip 12 may be implemented as discussed above with respect to FIG. 8. As is also shown in FIG. 9, the length of tube portion 4 may be longer than a length of scoop portion 6. However, the respective lengths of tube portion 4 and scoop portion 6 may be any suitable length with respect to each other.

Figure 10:
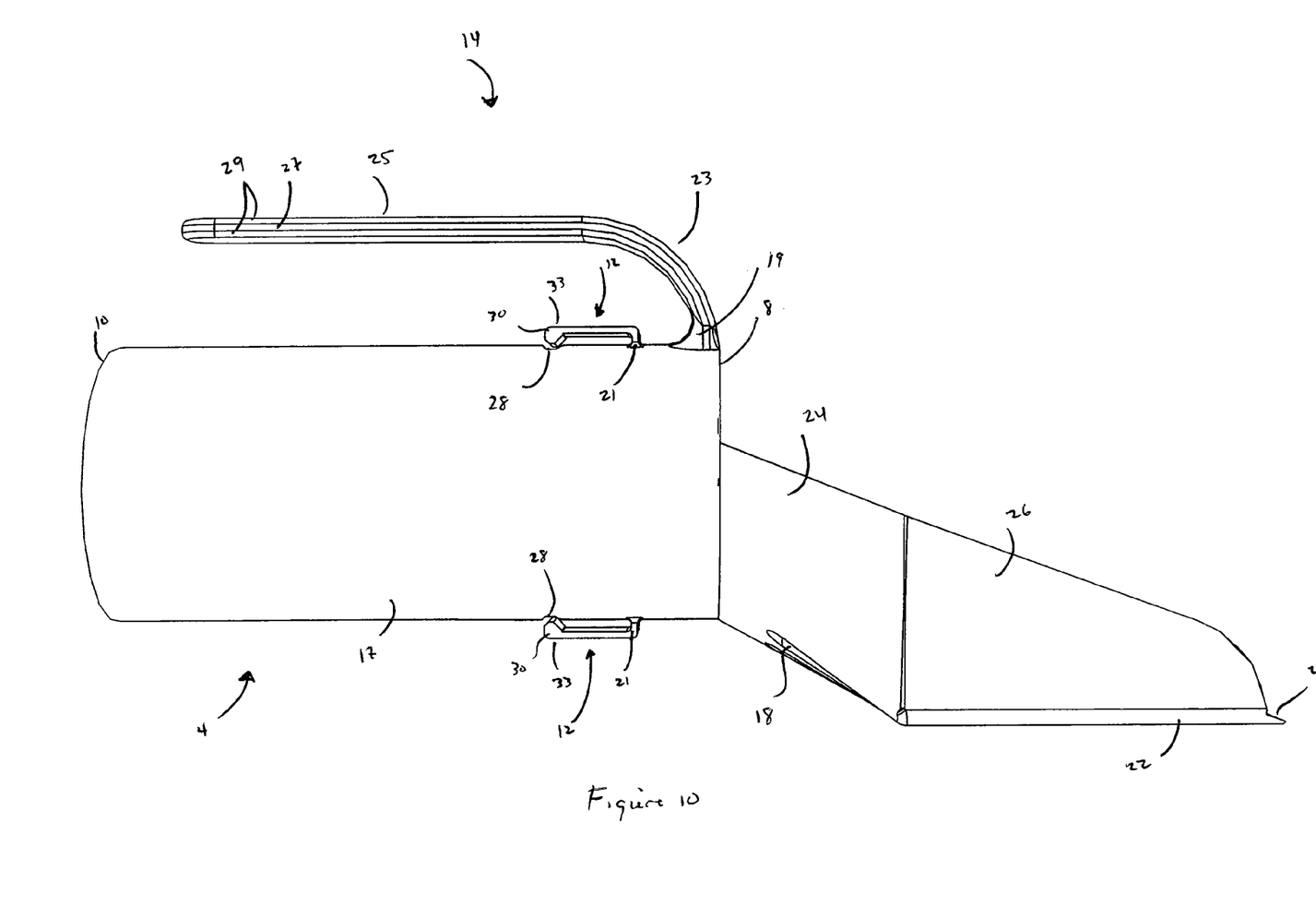
FIG. 10 represents a view from a first side of the apparatus for waste collection and disposal of FIG. 5, in accordance with an alternative embodiment of the present invention.

FIG. 10 represents a view from a first side of the apparatus for waste collection and disposal 2 of FIG. 5, in accordance with an alternative embodiment of the present invention. FIG. 10 shows handle portion 14 in greater detail. As discussed above with respect to FIGS. 1 and 2, handle portion 4 includes attachment portion 19, upwardly extending portion 23, and grip portion 25. Handle portion 4 may also include an inner portion 27 and an outer portion 29. Inner portion 27 may traverse the entire length of handle portion 4. Alternatively, inner portion 27 may be located in one or more of attachment portion 19, upwardly extending portion 23, and grip portion 25. In addition, inner portion 27 may be either one continuous piece or separated into multiple pieces. Inner portion 27 may be used to provide support for handle portion 4, and may be more rigid than outer portion 29. Inner portion 27 may be made of any suitable material, such as, but not limited to, metal, plastic, etc. Outer portion 29 may also traverse the entire length of handle portion 4 and may be one continuous piece, or as shown in FIG. 10, may be separated into multiple pieces. In addition, outer portion 29 may entirely or partially cover inner portion 27. FIG. 10, for example, shows outer portion 29 covering the top and bottom of inner portion 27, while leaving a first side of inner portion 27 uncovered. Outer portion 29 may be made of any suitable material, including, but not limited to, foam, plastic, etc.

FIG. 11 represents a view from a second side of the apparatus for waste collection and disposal of FIG. 5, in accordance with an alternative embodiment of the present invention. As can be seen from FIG. 11, outer portion 29 covers the top and bottom of inner portion 27, but leaves a second side of inner portion 27 uncovered.

FIG. 11 also shows a first clip 12 coupled to a top side of outer side 17 of tube portion 4 and a second clip 12 coupled to a bottom side of outer side 17 of tube portion 4, such that first and second clips 12 may be spaced apart from each other by a substantially equal interval in a tangential direction. Moreover, tube portion 4 may have more than two clips, with adjacent clips being coupled to outer side 17 of tube portion 4 at substantially equal distances in a tangential direction away from adjacent clips. Collection receptacle 34 may cover second end 10 of and be removably coupled by first and second clips 12 to tube portion 4.

Figure 12:
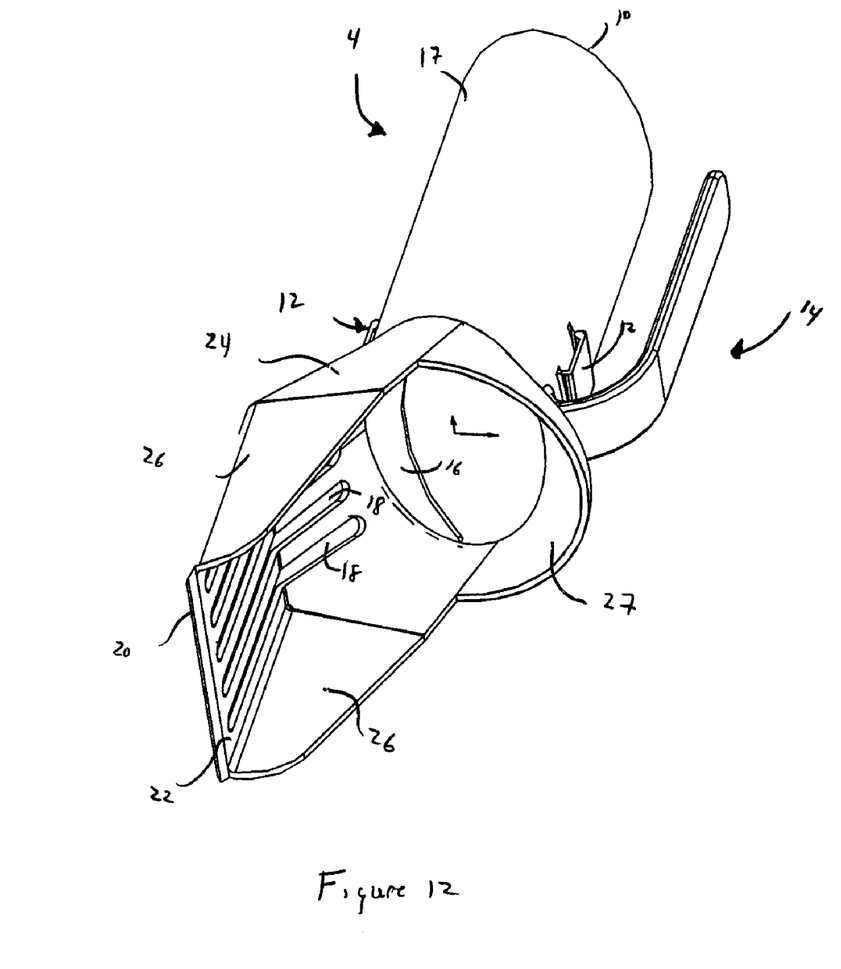
FIG. 12 represents a front perspective view of an apparatus for waste collection and disposal, in accordance with an alternative embodiment of the present invention.

FIG. 12 represents a front perspective view of an apparatus for waste collection and disposal, in accordance with an alternative embodiment of the present invention. FIG. 12 shows an alternative embodiment further including a hood portion 27. Hood portion 27 may be coupled to first end 8 of tube portion 4 and coupled to inclined portion 24. Hood portion 27 may take the shape of any suitable form and may extend in a direction outward and away from the first end 8 of said tube portion 4. Hood portion 27 may function to "funnel" waste into tube portion 4, thereby preventing spillage.

Figure 13:
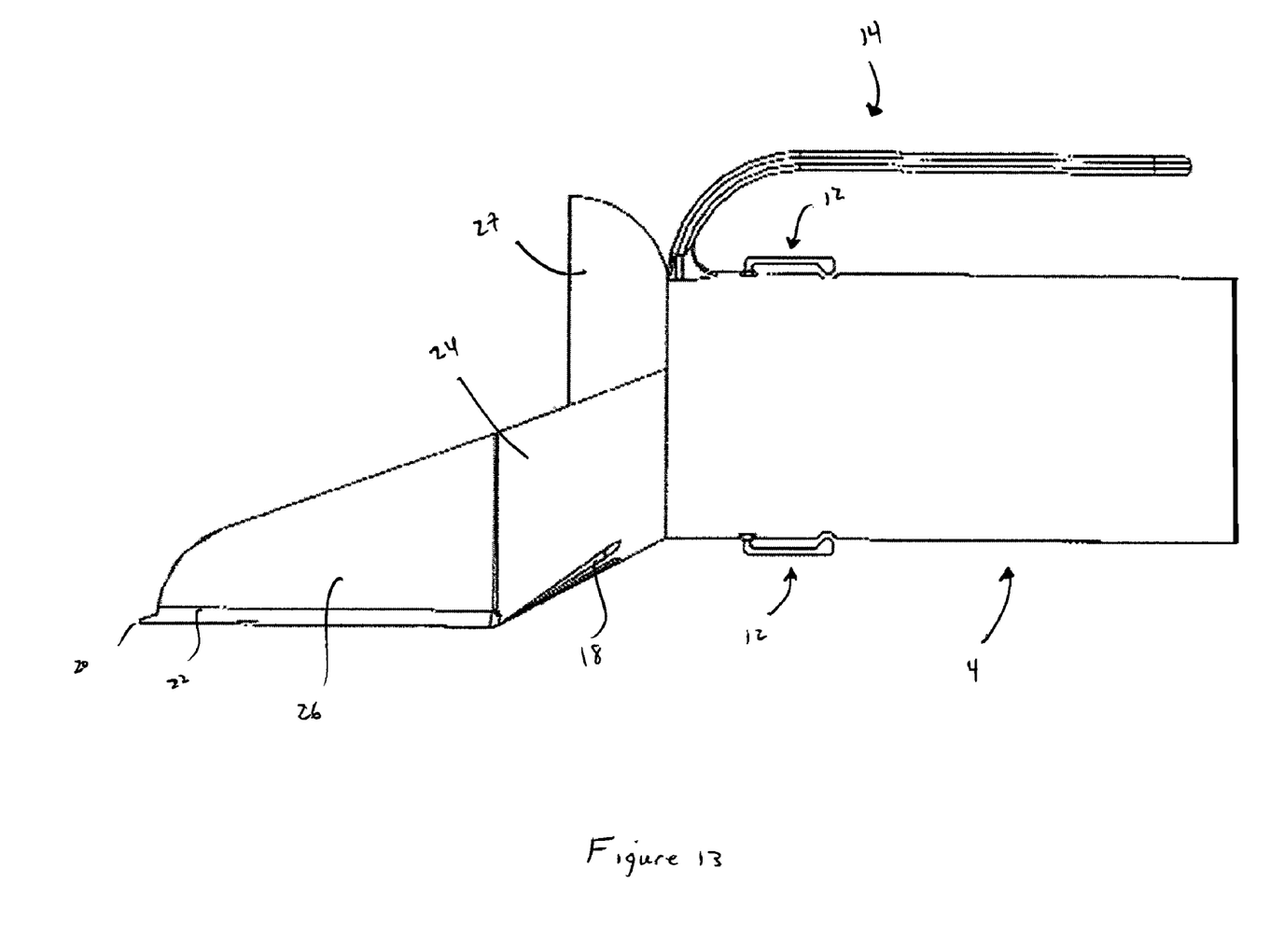
FIG. 13 represents a view from a first side of the apparatus for waste collection and disposal of FIG. 12, in accordance with an alternative embodiment of the present invention.

FIG. 13 represents a view from a first side of the apparatus for waste collection and disposal of FIG. 12, in accordance with an alternative embodiment of the present invention. FIG. 13, for example, shows hood portion 27 extending upward and away from a point on first end 8 of tube portion 4 adjacent attachment 19. Moreover, though shown in FIG. 13 as extending upward and away from first end 8, embodiments are contemplated in which hood portion 27 extends outwardly and away from first end 8 in a straight line (i.e., at an angle), with any suitable angle, but generally angles between zero and ninety degrees.

Also note that though not explicitly shown in relation to the embodiment represented by FIGS. 1-4, hood portion 27 may be implemented in and with the embodiment represented therein as well.

The foregoing description has been provided for illustrative purposes. Variations and modifications to the embodiments described herein may become apparent to persons of ordinary skill in the art upon studying this disclosure, without departing from the spirit and scope of the present invention.

List of Elements
2 waste collection and disposal apparatus
4 tube portion
6 scoop portion
8 first end of the tube portion
9 first opening of tube portion
10 second end of the tube portion
11 second opening of tube portion
12 clips
13 channel of tube
14 handle portion
15 inner side of tube
16 waste bar portion
17 outer side of tube
18 apertures
19 attachment portion
20 front edge portion of the scoop portion
21 first end of clip
22 flat portion of the scoop portion
23 upwardly extending portion
24 inclined portion
25 grip portion
26 sidewall portion
27 hood portion
28 recess
29 outer portion of handle
30 protrusion of clip
32 ridge
33 second end of clip
34 collection receptacle

What is claimed is:

1. An apparatus for waste collection and disposal, the apparatus comprising:
    a tube portion including a longitudinal axis, a first end defining a first opening, a second end defining a second opening, an outer side, an inner side defining a channel between the first and second ends, and a plurality of recesses formed on said outer side;
    a scoop portion coupled to the first end of said tube portion;
    a plurality of clips coupled to the outer side of said tube portion, each of said plurality of clips including a protrusion extending toward said tube portion and each of said recesses being associated with the protrusion of one of said plurality of clips; and
    a handle portion coupled to the outer side of said tube portion.

2. The apparatus for waste collection and disposal according to claim 1, wherein said tube portion further comprises a waste trap bar coupled to the inner side of said tube portion.

3. The apparatus for waste collection and disposal according to claim 1, wherein said plurality of clips are positioned about the outer side of said tube portion at substantially equal distances away from adjacent ones of said plurality of clips.

4. The apparatus for waste collection and disposal according to claim 1, wherein each of said protrusions extends into, and is biased toward, its said associated recess.

5. The apparatus for waste collection and disposal according to claim 1, wherein said tube portion further includes a plurality of ridges formed on its said outer side and extending outward from said tube portion, each of said plurality of ridges is adjacent to, and substantially parallel with, an associated one of said plurality of recesses and is associated with the associated protrusion.

6. The apparatus for waste collection and disposal according to claim 5, wherein each of said protrusion is biased toward its said associated ridge.

7. The apparatus for waste collection and disposal according to claim 1, wherein said scoop portion includes a plurality of apertures.

8. The apparatus for waste collection and disposal according to claim 7, wherein said plurality of apertures have rounded ends.

9. The apparatus for waste collection and disposal according to claim 7, wherein said plurality of apertures are longitudinally elongated.

10. The apparatus for waste collection and disposal according to claim 9, wherein said plurality of apertures have rounded ends.

11. The apparatus for waste collection and disposal according to claim 1, further comprising a hood portion coupled to the first end of said tube portion and to an inclined portion that is coupled between a flat portion and said tube portion, and said hood portion extends outwardly and upwardly away from the first end of said tube portion.

12. The apparatus for waste collection and disposal according to claim 1, wherein said scoop portion comprises:
 a front edge having an acute-angled edge;
 a flat portion coupled to said front edge;
 an inclined portion coupled between said flat portion and said tube portion;
 a plurality of sidewall portions coupled to said flat portion and said inclined portion; and
 a plurality of apertures formed in said flat portion.

13. The apparatus for waste collection and disposal according to claim 12, wherein each of said plurality of apertures is further formed in said inclined portion.

14. The apparatus for waste collection and disposal according to claim 1, further including a collection receptacle configured to be placed over a second end of said tube portion and removably coupled to each of said plurality of clips.

15. A method of manufacturing an apparatus for waste collection and disposal, the method comprising:
 providing a tube portion including a longitudinal axis, a first end defining a first opening, a second end defining a second opening, an outer side, an inner side defining a channel between the first and second ends, and a plurality of recesses formed on said outer side;
 coupling a scoop portion to the first end of said tube portion;
 coupling a plurality of clips to the outer side of said tube portion, each of said plurality of clips including a protrusion extending toward said tube portion and each of said recesses being associated with the protrusion of one of said plurality of clips; and
 coupling a handle portion to the outer side of said tube portion.

16. The method of manufacturing an apparatus for waste collection and disposal according to claim 15, the method further comprising coupling a waste trap bar to the inner side of said tube portion such that the waste trap bar is coupled substantially perpendicular to the longitudinal axis of said tube portion.

17. The method of manufacturing an apparatus for waste collection and disposal according to claim 15, the method further comprising providing said protrusion such that it extends into, and is biased toward its said associated recess.

18. The method of manufacturing an apparatus for waste collection and disposal according to claim 15, the method further comprising coupling a plurality of ridges to said outer side of said tube portion, such that each of said plurality of ridges extend outward from said tube portion,
 wherein each of said plurality of ridges is adjacent to and substantially parallel with an associated one of said plurality of recesses.

19. The method of manufacturing an apparatus for waste collection and disposal according to claim 15, the method further comprising providing said scoop portion with:
 a front edge having an acute-angled edge;
 a flat portion coupled to said front edge;
 an inclined portion coupled between said flat portion and said tube portion;
 a plurality of sidewall portions coupled to said flat portion and said inclined portion; and
 a plurality of apertures formed in said flat portion.

20. The method of manufacturing an apparatus for waste collection and disposal according to claim 19, the method further comprising coupling a hood portion coupled to the first end of said tube portion and to said inclined portion, such that
 said hood portion extends outwardly and away from the first end of said tube portion.

21. An apparatus for waste collection and disposal, the apparatus comprising:
 a tube portion including a longitudinal axis, a first end defining a first opening, a second end defining a second opening, an outer side, an inner side defining a channel between the first and second ends, and a waste trap bar coupled to, and extending away from an inner side of, and substantially perpendicular to, the longitudinal axis of said tube portion;
 a scoop portion coupled to a first end of said tube portion, the scoop portion including a front edge having an acute-angled edge, a flat portion coupled to said front edge, an inclined portion coupled between said flat portion and said tube portion, a plurality of sidewall portions coupled to said flat portion and said inclined portion, and a plurality of apertures being formed in said flat portion;
 a hood portion coupled to the first end of said tube portion and to said inclined portion;
 a plurality of clips coupled to an outer side of said tube portion, each of said plurality of clips including a protrusion extending toward said tube portion; and
 a handle portion coupled to the outside of said tube portion, said plurality of clips being positioned at substantially equal distances away from adjacent ones of said plurality of clips, and
 said tube portion further includes:
 a plurality of recesses, each of said recess being associated with the protrusion of one of said plurality of clips; and
 a plurality of ridges extending outwardly from said tube portion adjacent to, and substantially parallel with, an associated one of said plurality of recesses.

22. The apparatus for waste collection and disposal according to claim 21, wherein each said protrusion is biased toward its said associated recess and each said protrusion frictionally engages said ridge adjacent to and substantially parallel to said associated recess.

23. The apparatus for waste collection and disposal according to claim 21, wherein each of said plurality of apertures is elongated.

* * * * *